(12) United States Patent
Hu et al.

(10) Patent No.: US 12,500,299 B2
(45) Date of Patent: Dec. 16, 2025

(54) EXTRUDED SEALING LAYER FOR BIODEGRADABLE ELECTROCHEMICAL DEVICE AND METHODS THEREOF

(71) Applicant: XEROX CORPORATION, Norwalk, CT (US)

(72) Inventors: Nan-Xing Hu, Oakville (CA); Naveen Chopra, Oakville (CA); Gregory McGuire, Oakville (CA); Edward G. Zwartz, Mississauga (CA); Valerie M. Farrugia, Oakville (CA)

( * ) Notice: Subject to any disclaimer, the term of this patent is extended or adjusted under 35 U.S.C. 154(b) by 740 days.

(21) Appl. No.: 17/805,748

(22) Filed: Jun. 7, 2022

(65) Prior Publication Data

US 2023/0395911 A1  Dec. 7, 2023

(51) Int. Cl.

| | |
|---|---|
| *H01M 50/186* | (2021.01) |
| *C09D 11/037* | (2014.01) |
| *C09D 11/104* | (2014.01) |
| *H01M 50/109* | (2021.01) |
| *H01M 50/191* | (2021.01) |
| *H01M 50/193* | (2021.01) |
| *H01M 50/195* | (2021.01) |

(52) U.S. Cl.
CPC ......... *H01M 50/186* (2021.01); *C09D 11/037* (2013.01); *C09D 11/104* (2013.01); *H01M 50/109* (2021.01); *H01M 50/191* (2021.01); *H01M 50/193* (2021.01); *H01M 50/195* (2021.01)

(58) Field of Classification Search
CPC .. H01M 50/183; H01M 50/186; H01M 50/19; H01M 50/193; H01M 50/197
See application file for complete search history.

(56) References Cited

U.S. PATENT DOCUMENTS

| | | | |
|---|---|---|---|
| 10,752,772 B1 | 8/2020 | Kogot et al. | |
| 2016/0177136 A1* | 6/2016 | Park | C09J 7/385 |
| | | | 429/185 |
| 2018/0346706 A1* | 12/2018 | Jin | C08K 5/101 |
| 2022/0320595 A1* | 10/2022 | Zhao | H01M 50/124 |
| 2023/0006262 A1* | 1/2023 | Maruhashi | H01M 10/0587 |

FOREIGN PATENT DOCUMENTS

WO   WO-2021034899 A1 *  2/2021  ............. C25B 13/08

\* cited by examiner

*Primary Examiner* — Barbara L Gilliam
*Assistant Examiner* — Jordan E Berresford
(74) *Attorney, Agent, or Firm* — MH2 Technology Law Group LLP

(57) ABSTRACT

An electrochemical device including a first substrate layer is disclosed. The electrochemical device also includes an anode disposed upon the first substrate layer. The device also includes a second substrate layer. The electrochemical device also includes a cathode disposed upon the second substrate layer and an electrolyte composition disposed between and in contact with the anode and the cathode. The electrochemical device also includes an extruded sealing layer composition disposed between the first substrate layer and the second substrate layer. A sealing layer composition and a method of producing a sealing layer is also disclosed.

19 Claims, 3 Drawing Sheets

EXTRUDED SEALING LAYER FOR BIODEGRADABLE ELECTROCHEMICAL DEVICE AND METHODS THEREOF

TECHNICAL FIELD

The presently disclosed examples or implementations are directed to biodegradable electrochemical devices, sealing layers thereof, and fabrication methods for the same.

BACKGROUND

The number of batteries being produced in the world is continuously increasing as a consequence of the growing need for portable and remote power sources. Particularly, a number of new technologies require batteries to power embedded electronics. For example, embedded electronics, such as portable and wearable electronics, Internet of Things (IoT) devices, patient healthcare monitoring, structural monitoring, environmental monitoring, smart packaging, or the like, rely on batteries for power. While conventional batteries may be partially recycled, there are currently no commercially available batteries that are environmentally friendly or biodegradable. As such, an increase in the manufacture and use of conventional batteries results in a corresponding increase in toxic and harmful waste in the environment if not properly disposed of or recycled. In view of the foregoing, there is a need to develop improved biodegradable batteries; especially for applications that utilize disposable batteries for a limited time before being discarded.

Further, to meet the demand for flexible, low-cost, medium or low performance batteries, all-printed batteries have been developed. Batteries require moisture to maintain electrolyte activity to deliver current. Maintaining adequate hydration of thin film printed batteries and other electrochemical devices is especially challenging owing to their high surface area and the nature of their assembly. A robust sealing layer or gasket can be used to prevent drying out of the cells and other sections or layers within an electrochemical device. Many adhesives and sealants are non-biodegradable, and do not meet compostability standards to enable a fully compostable battery or electrochemical device. Furthermore, the use of adhesives or glue can be prohibitive in terms of cleanliness and applicability to an all-printed approach to make a thin-film printed battery or electrochemical device.

There is a need for processes to create biodegradable printable sealing layer with good fidelity, (defect-free, controlled thickness, and uniform properties) and electrochemical devices such as batteries made using such processes.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the present disclosure include an electrochemical device. The electrochemical device also includes a first substrate. The electrochemical device also includes a first electrode disposed upon the first substrate. The electrochemical device also includes a second substrate. The electrochemical device also includes an extruded sealing layer composition disposed between the first substrate and the second substrate.

Implementations of the electrochemical device may include where the extruded sealing layer composition includes a crosslinked polymer. The extruded sealing layer composition may include a biodegradable material. The extruded sealing layer composition may include poly($\varepsilon$-caprolactone) (PCL). The extruded sealing layer composition may include polylactic acid (PLA). The extruded sealing layer composition may include a biodegradable polymer, and a filler. The biodegradable polymer may include a particle having a particle size of from about 0.05 microns to about 250 microns. The filler is present in the extruded sealing layer composition in an amount of from about 1.0% to about 30.0% based on a total weight of the extruded sealing layer composition. The filler may include cellulose, clay, mica, or a combination thereof. The extruded sealing layer composition is disposed between the first substrate and the second substrate in a laterally non-continuous pattern. The extruded sealing layer may include a first portion and a second portion, the second portion may include a thickness greater than that of the first portion.

A sealing layer composition is disclosed, the sealing layer composition including a biodegradable polymer. The sealing layer composition also includes a filler such as cellulose, clay, mica, or a combination thereof, and where the sealing layer composition is extruded. Implementations of the sealing layer composition include where the sealing layer composition is incorporated into an electrochemical device. The electrochemical device may include a battery. The filler is present in the extruded sealing layer composition in an amount of from about 1.0% to about 30.0% based on a total weight of the extruded sealing layer composition.

A method of producing a sealing layer is also disclosed. The method of producing a sealing layer also includes preparing a substrate. The producing a sealing layer also includes dispensing a sealing layer composition from an extrusion dispenser onto the substrate. The producing a sealing layer also includes drying the sealing layer composition. The method of producing a sealing layer may include subjecting the sealing layer to a higher temperature. The method of producing a sealing layer may include dispensing two or more layers of sealing layer composition. The sealing layer composition may include a biodegradable polymer and a filler may include cellulose, clay, mica, or a combination thereof. The sealing layer composition may have a viscosity from about 1,000 cP to about 1,000,000 cP.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings. These and/or other aspects and advantages in the embodiments of the disclosure will become apparent and more readily appreciated from the following description of the various embodiments, taken in conjunction with the accompanying drawings of which.

Figure 1:
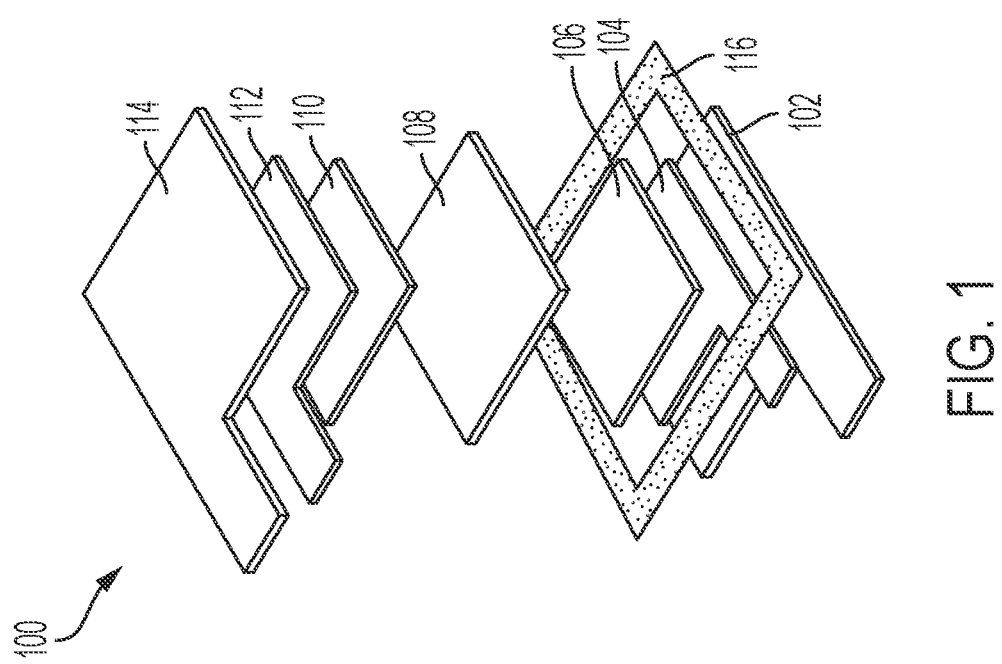
FIG. 1 illustrates an exploded view of an exemplary electrochemical device in a stacked configuration, in accordance with the present disclosure.

It should be noted that some details of the figures have been simplified and are drawn to facilitate understanding of the present teachings rather than to maintain strict structural accuracy, detail, and scale.

DETAILED DESCRIPTION

The following description of various typical aspect(s) is merely exemplary in nature and is in no way intended to limit the disclosure, its application, or uses.

As used throughout, ranges are used as shorthand for describing each and every value that is within the range. Any value within the range may be selected as the terminus of the range. In addition, all references cited herein are hereby incorporated by reference in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes examples containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on."

Reference will now be made in detail to exemplary examples of the present teachings, examples of which are illustrated in the accompanying drawings. Wherever possible, the same reference numbers will be used throughout the drawings to refer to the same, similar, or like parts.

A biodegradable electrochemical device is disclosed herein. As used herein, the term "biodegradable" or "biodegradable material" may refer to a material, component, substance, device, or the like, capable of or configured to be decomposed by living organisms, particularly microorganisms in a landfill within a reasonable amount of time. The material, component, substance, device, or the like may be decomposed into water, naturally occurring gases like carbon dioxide and methane, biomass, or combinations thereof. As used herein, the expression "biodegradable electrochemical device" or "biodegradable device" may refer to an electrochemical device or a device, respectively, where at least one or more components thereof is biodegradable. In some instances, a majority or substantial number of the components of the biodegradable electrochemical device or the biodegradable device are biodegradable. In other instances, all of the polymer components of the biodegradable electrochemical device or the biodegradable device are biodegradable. For example, the polymers and/or other organic-based components of the electrochemical device are biodegradable while the inorganic materials of the electrochemical device disclosed herein, including the metals and/or metal oxides, may not be biodegradable. It should be appreciated that if all polymer and/or organic-based components of an electrochemical device are biodegradable, it is generally accepted that the complete electrochemical device is considered biodegradable. As used herein, the term "compostable" may refer to items that are able to be made into compost or otherwise disposed of in a sustainable or environmentally friendly manner. Compostable materials may be considered to be a subset category of biodegradable materials wherein additional specific environmental temperatures or conditions may be needed to break down a compostable material. While the term compostable is not synonymous with biodegradable, they may be used interchangeably in some instances, wherein the conditions necessary to break down or decompose a biodegradable material are understood to be similar to the conditions necessary to break down a compostable material. As used herein, the term or expression "electrochemical device" may refer to a device that converts electricity into chemical reactions and/or vice-versa. Illustrative electrochemical devices may be or include, but are not limited to, batteries, dye-sensitized solar cells, electrochemical sensors, electrochromic glasses, fuel cells, electrolysers, or the like.

As used herein, the term or expression "environmentally friendly electrochemical device" or "environmentally friendly device" may refer to an electrochemical device or device, respectively, that exhibits minimal, reduced, or no toxicity to the ecosystems or the environment in general. In at least one example, the electrochemical devices and/or components thereof disclosed herein are environmentally friendly.

As used herein, the term or expression "film" or "barrier layer" may refer to a thin, partially or substantially plastic and/or polymeric material that may be used in various electrochemical device components or parts, including, but not limited to substrates, connections, enclosures, barriers, or combinations thereof. Films as described herein may be rigid or flexible, depending upon the inherent physical properties or dimensions of their respective compositions. In at least one example, these films or barrier layers may be environmentally friendly or biodegradable.

As used herein, the term or expression "enclosure," "barrier," or "water vapor barrier" may refer to materials utilized in partially sealed, fully sealed or otherwise used to prevent moisture, water or other volatile materials from entering or exiting via the barrier of an electrochemical device. In at least one example, these enclosures may be environmentally friendly or biodegradable.

In at least one example, the electrochemical device disclosed herein may include an anode, a cathode (i.e., a current collector and/or an active layer), and one or more electrolyte compositions (e.g., a biodegradable solid aqueous electrolyte composition). In another example, the biodegradable electrochemical device may further include one or more substrates, one or more seals, one or more packages, one or more pouches, one or more enclosures, or combinations thereof.

The electrochemical devices disclosed herein may be flexible. As used herein, the term "flexible" may refer to a material, device, or components thereof that is capable of being bent around a predetermined radius of curvature without breaking and/or cracking. The biodegradable electrochemical devices and/or the components thereof disclosed herein may be bent around a radius of curvature of about 30 cm or less, about 20 cm or less, about 10 cm or less, about 5 cm or less without breaking or cracking.

As used herein, the term "immiscible" refers to a mixture of components that, when combined, form two or more phases that have less than 5 wt. % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt. % solubility in each other at 65° C.

As used herein, the term "nanoparticle" refers to a particulate material having a particulate size ranging from about 1 nm to about 500 nm.

As used herein, the terms "associated," "association," and grammatical variations thereof refer to admixture or blending of nanoparticles and a matrix polymer. Depending on type, nanoparticles may be homogenously or heterogeneously blended with a matrix polymer in the disclosure herein, inclusive of localization upon the surface of a matrix polymer. At least some nanoparticles may be associated with an outer surface of polymer particulates through physical adherence, hydrogen bonding and/or other mechanisms. However, chemical bonding may be occurring to some degree.

As used herein, the term "oxide" refers to both metal oxides and non-metal oxides. For purposes of the present disclosure, silicon is considered to be a metal.

Exemplary examples of a 3D printable paste extruded sealing layer composition may include compositions as described herein, and can be included in an electrochemical device, such as a battery, or a biodegradable battery. Sealing layers within an electrochemical device can provide a barrier layer around the periphery of the electrochemical device, thereby encapsulating the electrochemical device. The sealing layer can provide a barrier to prevent or reduce moisture loss or moisture evaporation from one or more components within an electrochemical device. Alternate examples of devices or apparatus including an extruded sealing layer composition as described herein may include, but are not limited to, carbon capture or carbon dioxide reduction devices, galvanic cells, or electrolyzers. While an electrolyzer is a system that can utilize electricity to break water into hydrogen and oxygen in an electrolysis process, other systems that enact a chemical process with the use of electricity may incorporate 3D printable paste extruded sealing layer compositions as described herein. Thus, a portion of a 3D printed electrochemical device or battery having a paste extruded sealing layer composition and process to create a sealing layer with varying thickness to minimize moisture loss can be provided.

FIG. 1 illustrates an exploded view of an exemplary electrochemical device in a stacked configuration, in accordance with the present disclosure. As illustrated in FIG. 1, the electrochemical device 100 may include a first substrate 102, a first current collectors 104 disposed adjacent to or on top of the first substrate 102, an anode active layer 106 disposed adjacent to or on top of the first current collector 104, an electrolyte layer 108 disposed adjacent to or on top of the anode 106, a cathode active layer 110 disposed adjacent to or on top of the electrolyte composition 108, a second current collector 112 disposed adjacent to or on top of the cathode active layer 110, and a second substrate 114 disposed adjacent to or on top of the second current collector 112. It should be appreciated that the first current collector 104 and the anode active layer 106 may be collectively referred to herein as an anode of the electrochemical device 100. It should further be appreciated that the second current collector 112 and the cathode active layer 110 may be collectively referred to herein as a cathode of the electrochemical device 100. As illustrated in FIG. 1, the anode and the cathode of the electrochemical device 100 may be arranged in a stacked configuration or geometry such that the anode and the cathode are disposed on top of or below one another.

In certain examples, the electrochemical device 100 may include one or more seals 116, capable of or configured to hermetically seal the current collectors 104, 106, the anode active layer 106, the cathode active layer 110, and the electrolyte composition 108 between the first and second substrates 102, 114 of the electrochemical device 100. For example, as illustrated in FIG. 1, the biodegradable electrical device 100 may include a seal 116 interposed between the first and second substrates 102, 114 and about the current collectors 104, 112, the anode active layer 106, the cathode active layer 110, and the electrolyte composition 108 to hermetically seal the biodegradable electrochemical device 100. For example, the substrates 102, 114 may be melted or bonded with one another or by melting or bonding with the seal 116 to seal the biodegradable electrochemical device 100. In still other examples, each of the current collectors 104, 106, may include a respective tab that may extend outside the body of the electrochemical device 100 to thereby provide connectivity. In some examples, the electrochemical device 100 may be arranged in a side-by-side or coplanar configuration. Further, the anode and the cathode of the electrochemical device 100 may be coplanar such that the anode and the cathode are arranged along the same X-Y plane, with a seal surrounding and sealing both in that same plane.

In at least one example, any one or more of the substrates of the electrochemical device 100 may be or include, but is not limited to, a biodegradable substrate. Illustrative biodegradable substrates may be or include, but are not limited to, one or more of polylactic acid (PLA), polylactic-co-glycolic acid (PLGA), silk-fibroin, chitosan, polycaprolactone (PCL), polyhydroxybutyrate (PHB), rice paper, cellulose, or combinations or composites thereof.

The anode active layer 106 of exemplary biodegradable electrochemical devices 100 may be or include, but are not limited to, one or more of zinc (Zn), lithium (Li), carbon (C), cadmium (Cd), nickel (Ni), magnesium (Mg), magnesium alloys, zinc alloys, or the like, or combinations and/or alloys thereof. Illustrative anode active layers or materials thereof may be or include, but are not limited to, or the like, or combinations thereof. In at least one example, the anode active layer may include zinc oxide (ZnO) in a sufficient amount to regulate or control $H_2$ gassing.

In at least one example, the anode active layer 106 of exemplary biodegradable electrochemical devices 100 may be prepared or fabricated from an anode paste. For example, the anode active layer may be prepared from a zinc anode paste. The anode paste may be prepared in an attritor mill. In at least one example, stainless steel shot may be disposed in the attritor mill to facilitate the preparation of the anode paste. The anode paste may include one or more metal or metal alloys, one or more organic solvents, one or more styrene-butadiene rubber binders, or combinations thereof. In an exemplary example, the anode paste may include one or more of ethylene glycol, a styrene-butadiene rubber binder, zinc oxide (ZnO), bismuth (III) oxide ($Bi_2O_3$), Zn dust, or combinations thereof. Illustrative organic solvents are known in the art and may be or include, but are not limited to, ethylene glycol, acetone, NMP, or the like, or combinations thereof. In at least one example, any one or more biodegradable binders may be utilized in lieu of or in combination with a styrene-butadiene rubber binder.

The cathode active layer 110 of exemplary biodegradable electrochemical devices 100 may be or include, but are not limited to, one or more of iron (Fe), iron (VI) oxide, mercury oxide (HgO), manganese (IV) oxide ($MnO_2$), carbon (C), carbon-containing cathodes, gold (Au), molybdenum (Mo), tungsten (W), molybdenum trioxide ($MoO_3$), silver oxide ($Ag_2O$), copper (Cu), vanadium oxide ($V_2O_5$), nickel oxide (NiO), copper iodide ($Cu_2I_2$), copper chloride (CuCl), or the like, or combinations and/or alloys thereof. In an exemplary example, the cathode active layer 110 may include manganese (IV) oxide. The carbon and/or carbon-containing cathode active layers may be utilized in aqueous metal-air batteries, such as zinc air batteries.

In at least one example, the cathode active layer 110 may include one or more additives capable of or configured to at least partially enhance the electronic conductivity of the cathode active layer 110. Illustrative additives may be or include, but are not limited to, carbon particles, such as graphite, carbon nanotubes, carbon black, or the like, or the like, or combinations thereof.

In at least one example, the cathode active layer 110 of an exemplary biodegradable electrochemical device 100 may be prepared or fabricated from a cathode paste. For example, the cathode active layer 110 may be prepared from a manganese (IV) oxide cathode paste. The cathode paste may be prepared in an attritor mill. In at least one example, stainless steel shot may be disposed in the attritor mill to facilitate the preparation of the cathode paste. The cathode paste may include one or more metal or metal alloys, one or more organic solvents (e.g., ethylene glycol), one or more styrene-butadiene rubber binders, or combinations thereof. In an exemplary example, the cathode paste may include one or more of ethylene glycol, a styrene-butadiene rubber binder, manganese (IV) oxide ($MnO_2$), graphite, or combinations thereof. Illustrative organic solvents are known in the art and may be or include, but are not limited to, ethylene glycol, acetone, NMP, or the like, or combinations thereof. In at least one example, the one or more organic solvents may be replaced or used in combination with an aqueous solvent, such as water. For example, water may be utilized in combination with manganese (IV) oxide.

In at least one example, each of the anodes and the cathodes, or the active layers 106, 110 thereof may independently include a biodegradable binder. The function of the biodegradable binder is to anchor the particles of each of the respective layers together and provide adhesion to the substrate underneath, the respective layers being the anode current collector 104, the cathode current collector 112 the anode active layer 106, the cathode active layer 110, or combinations thereof. Illustrative biodegradable binders may be or include, but are not limited to, one or more of chitosan, polylactic-co-glycolic acid (PLGA), gelatin, xanthan gum, cellulose acetate butyrate (CAB), polyhydroxybutyrate (PHB), or a combination thereof. In at least one example, any one or more of the biodegradable polymers disclosed herein with regard to the electrolyte composition may also be utilized as the biodegradable binder of the anode, the cathode, components thereof, or any combination thereof. As further described herein, the one or more biodegradable polymers may be cross-linked. As such, the biodegradable binders utilized for the anode, the cathode, and/or the components thereof, may include the cross-linked biodegradable binders disclosed herein with regard to the electrolyte composition.

The electrolyte layer 108 of exemplary biodegradable electrochemical devices 100 may be or include an electrolyte composition. The electrolyte composition may utilize biodegradable polymeric materials. The electrolyte composition may be a solid, aqueous electrolyte composition. The solid, aqueous electrolyte composition may be or include a hydrogel of a copolymer and a salt dispersed in and/or throughout the hydrogel. The copolymer may include at least two polycaprolactone (PCL) chains attached with a polymeric center block (CB). For example, the copolymer may be a block copolymer or a graft copolymer including at least two PCL chains coupled with the polymeric center block, such as PCL-CB-PCL. In another example, the copolymer may be a block copolymer or a graft copolymer including at least one or more of polylactic acid (PLA), polyglycolic acid (PGA), polyethylene imine (PEI) or combinations thereof, coupled with the polymeric center block.

The polymeric center block of the copolymer may be a biodegradable polymer, thereby improving or increasing biodegradability of the solid, aqueous electrolyte composition. The biodegradable polymer of the polymeric center block is preferably naturally occurring. The polymeric center block may be or include, or be derived from, a polymer, such as a biodegradable polymer, including at least two free hydroxyl groups available for reaction with ε-caprolactone, in a non-limiting example.

In at least one example, the polymeric center block of the copolymer may not be a biodegradable polymer. For example, the polymeric center block of the copolymer may be or include, but is not limited to, polyethylene glycol (PEG), hydroxy-terminated polyesters, hydroxyl-terminated polyolefins, such as hydroxy-terminated polybutadiene, or the like, or combinations thereof.

The copolymer, including at least two polycaprolactone (PCL) chains bonded to the polymeric center block, may be a graft copolymer or a block copolymer. Whether the copolymer is a graft copolymer or a block copolymer may be at least partially determined by the number and/or placement of the at least two free hydroxyl groups of the polymeric center block. For example, reacting ε-caprolactone with polymeric center blocks having the hydroxyl groups on monomers along a length of the polymeric center block chain forms graft copolymers. In another example, reacting ε-caprolactone with polymeric center blocks having each of the hydroxyl groups at respective ends of the polymeric center blocks forms block copolymers. Illustrative block copolymers may be or include triblock copolymers, tetrablock copolymers, star block copolymers, or combinations thereof.

The salt may be present in an amount capable of, configured to, or sufficient to provide ionic conductivity. In at least one example, the electrolyte composition may include one or more additives. The one or more additives may be or include, but are not limited to, biodegradable or environmentally friendly nanomaterials. The biodegradable nanomaterials may be capable of or configured to provide and/or improve structural strength of the electrolyte layer or the electrolyte composition thereof without sacrificing flexibility of the electrolyte layer or the electrolyte composition thereof. In at least one example, the electrolyte composition may include an aqueous solvent. For example, the electrolyte composition may include water. In at least one example, the electrolyte composition may include a co-solvent. For example, the electrolyte composition may include water and an additional solvent.

The current collectors 104, 112 of exemplary biodegradable electrochemical devices 100 may be capable of or configured to receive, conduct, and deliver electricity. Illustrative current collectors 104, 112 may be or include, but are not limited to, silver, such as silver microparticles and silver nanoparticles, carbon, such as carbon black, graphite, carbon fibers, carbon nanoparticles, such as carbon nanotubes, graphene, reduced graphene oxide (RGO), or the like, or any combination thereof.

An exemplary formulation of a paste extruded sealing layer composition may include a compostable or biodegradable polymer particle or powder dispersed in a fluid or liquid medium. Non limiting examples of suitable biodegradable powder compositions and methods of manufacture for creating compostable or biodegradable batteries using a paste extrusion approach to create an extruded sealing layer composition and extruded sealing layer can include the use of biodegradable materials such as cellulose acetate, cellulose acetate butyrate, cellulose acetate propionate, cellulose nitrate, polyhydroxyalkanoates (PHA) such as polyhydroxybutyrate (PHB), poly(3-hydroxyvalerate), and poly(3-hydroxybutyrate-co-3-hydroxyvalerate), polylactic acid (PLA), polyglycolic acid (PGA), poly(ε-caprolactone) (PCL), starch, and chitosan, as well as combinations thereof. Specifically, the proposed paste may comprise a slurry of biodegradable polymer particles and a biodegradable polymer binder. Moreover, the paste may further include natural nano- or micro-sized fibers or a mineral filler. The biodegradable polymers suitable for the particles or the binder may include the above-referenced cellulose acetate, cellulose acetate butyrate, cellulose acetate propionate, cellulose nitrate, polyhydroxyalkanoates (PHA) such as polyhydroxybutyrate (PHB), poly(3-hydroxyvalerate), and poly(3-hydroxybutyrate-co-3-hydroxyvalerate), polylactic acid (PLA), polyglycolic acid (PGA), poly(ε-caprolactone) (PCL), starch, polysaccharide, and chitosan. The paste may alternatively or additionally include partially bio-based and biodegradable polymers such as polybutylene succinate, poly(butylene adipate-co-terephthalate), PLA blends, and starch blends; and fossil fuel-based and biodegradable polymers such as polybutylene succinate, poly(butylene adipate-co-terephthalate), poly(butylene succinate-co-lactide), poly(butylene succinate-co-terephthalate), poly(ε-caprolactone), polyglycolide, poly(methylene adipate-co-terephthalate), and polyvinyl alcohol. The biodegradable polymer particles may have a particle size in a range of from about 0.05 μm to about 250 μm. A high-volume percent, for example, from 20% to about 90%, of the biodegradable particles may be included in the extrusion paste sealing layer composition. These particles may be produced by any number of techniques known to those skilled in the art, for example, a melt emulsification process. The biodegradable polymer binder portion of the extrusion paste sealing layer composition may be formulated in combination with a liquid media such as water to achieve suitable viscosity for specific extrusion printers or processes. One or more suitable fillers may be added to the paste to further enhance the water vapor barrier of the printed sealing layer. Exemplary fillers may include nano- or micro-cellulose, and mineral fillers such as nano-clays, mica, experimental alloys, and the like. Fillers can be present in an extrudable paste sealing layer composition in an amount from about 1.0% to about 30.0%, from about 2.5% to about 25.0%, or from about 5.0% to about 20.0%, expressed as a percentage of total weight of an extrudable paste sealing layer composition. A biodegradable paste extrudable sealing layer composition may have a viscosity ranging from about 1,000 cP to about 100,000 cP, or from about 5,000 cP to about 75,000 cP, or from about 10,000 cP to about 1,000,000 cP.

Figure 2:
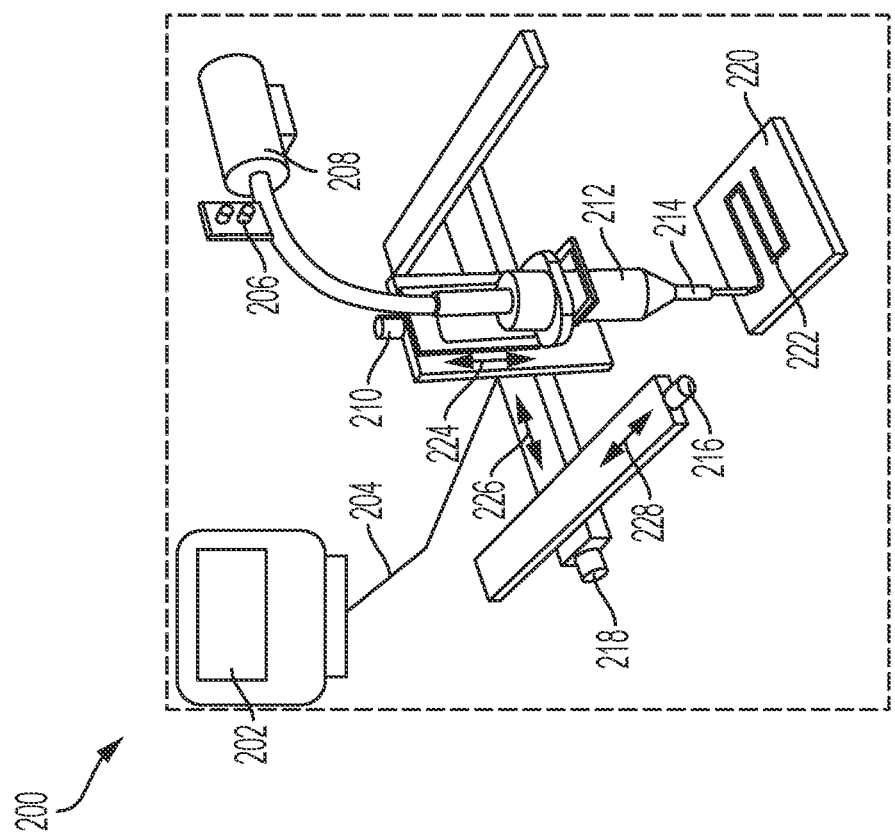
FIG. 2 illustrates a schematic view of an extrusion device capable of dispensing an extruded sealing layer for an electrochemical device, in accordance with the present disclosure.

FIG. 2 illustrates a schematic view of an extrusion device capable of dispensing or extruding an extruded sealing layer for an electrochemical device, in accordance with the present disclosure. While this is an example schematic view of an extrusion device 200 suitable for dispensing a sealing layer composition for a sealing layer for an electrochemical device, other means of dispensing a sealing layer in accordance with the present disclosure may be employed. The extrusion device 200 includes a computer processing unit 202 capable of communicating directions to the remainder of the extrusion device 200 via a communication wire 204. The extrusion device 200 includes a pressure or flow controller 206 used to regulate either air or material flow into a pump 208, which is connected to a dispensing head 212 and delivers material, such as a sealing layer composition, thereto. The dispensing head 212 has a nozzle 214, through which a material is delivered to a substrate 220. Depending upon the instructions, including flow rate of material, patterning of the dispensed material, or other instructions received from the computer processing unit 202, an x-axis motor 218, y-axis motor 216, and z-axis motor 210 translate the substrate and/or the dispensing head 212 along an x-axis movement 226, y-axis movement 228, and z-axis movement 224, respectively. This movement and the instructions received from the computer processing unit 202 provide a desired pattern and quantity of a deposited or dispensed sealing layer composition 222 upon the substrate 220. The use of an extrusion process to produce an extruded sealing layer with extruded material compositions further provides advantages for an extruded sealing layer composition for an electrochemical device. For example, as an extruded sealing layer composition is heated, crosslinked, or dried, the properties of the biodegradable polymer and the fillers added to the composition in combination with flow properties of a slurry or extrudable paste formulation can provide a formed sealing layer where interstitial gaps between adjacent electrochemical device components or adjacent depositions of extruded paste composition are more readily filled, overlapped, or combined within the layer, providing a more effective barrier to moisture escape from an electrochemical device. In certain aspects of the present disclosure, remnants of deposited paste paths as determined by the programming of the extrusion head or printer, while fully formed and providing the benefits of a fully processed sealing layer, can exhibit detectable flow or deposition artifacts in a sealing layer when viewed under certain analytical techniques, for example, light microscopy. These noted artifacts, the presence of extrudable and, in some cases, crosslinkable biodegradable polymers, the presence of fillers that enhance the moisture barrier properties of the sealing layer, or combinations thereof, are non-limiting examples of the characteristic physical effects associated with extruded sealing layer compositions. Material properties of sealing layers of the present disclosure may include a range of rubbery to plastic properties depending on the particular electrochemical device design and the particular sealing layer composition.

Figure 3:
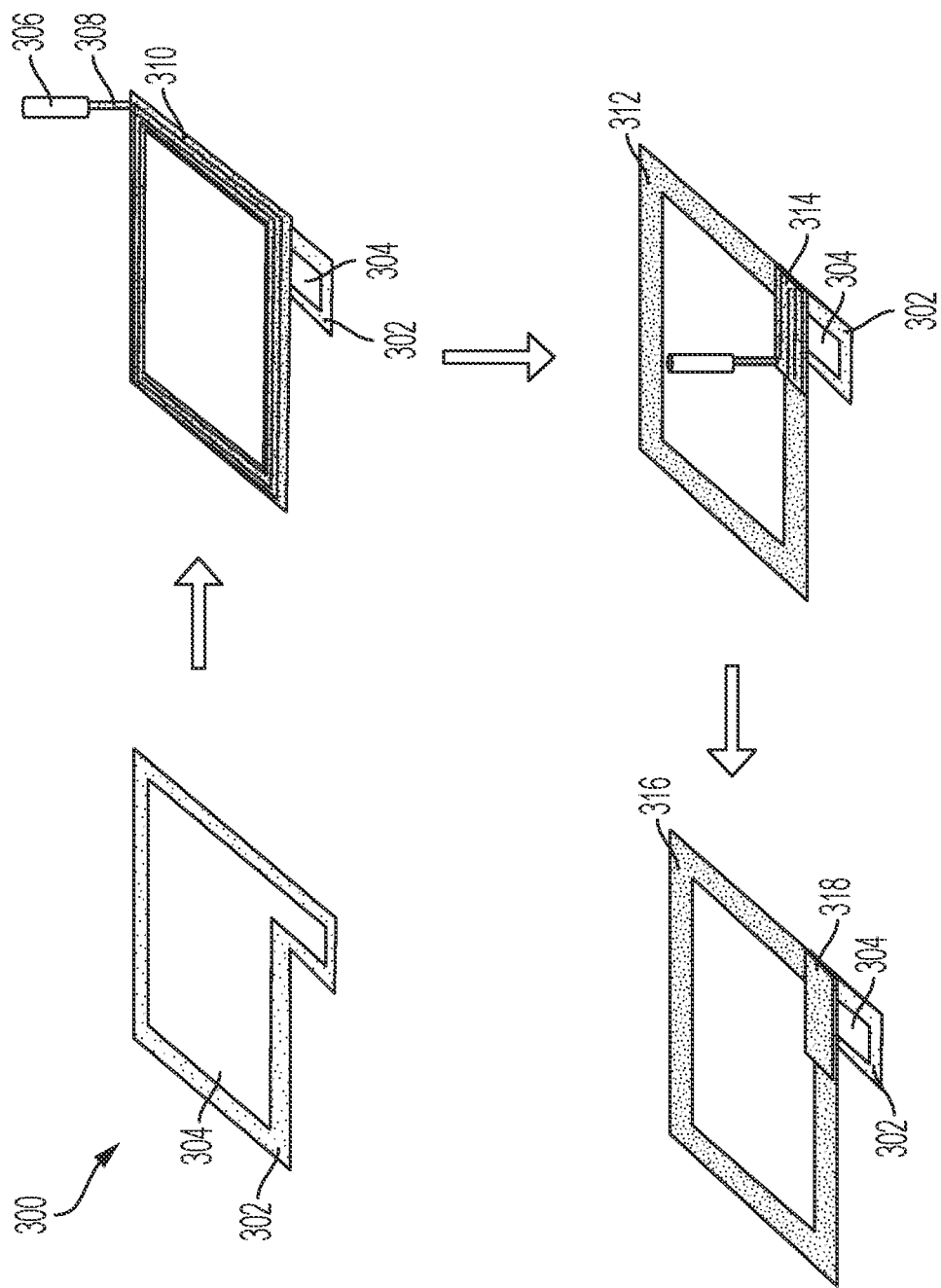
FIG. 3 illustrates a schematic of a process for providing a paste extruded sealing layer for an electrochemical device, in accordance with the present disclosure.

Exemplary examples of the present disclosure may provide methods for fabricating an electrochemical device, and in particular, providing a sealing layer composition layer for an electrochemical device. FIG. 3 illustrates a schematic of a process for providing a paste extruded sealing layer for an electrochemical device, in accordance with the present disclosure. The process for providing a sealing layer for an electrochemical device 300 includes providing a substrate 302 having a current collector 304, or electrode, which may include an anode or a cathode depending on the order of fabrication of the electrochemical device, attached thereto. A dispensing nozzle 306 provides a stream of sealing layer composition 308 in a predetermined pattern onto a surface of the current collector 304. The pattern may be continuous or non-continuous in examples. A layer of deposited sealing layer composition 310 is dispensed in a pattern and may be applied in a pattern across or around the surface of the current collector 304. The sealing layer composition 310 is allowed to settle and level to form a coalesced sealing layer 312. The coalesced sealing layer 312 is then present on a surface of the current collector 304, while leaving a portion of the current collector 304 exposed for connection or continuity between internal components of the electrochemical device and external components, connections, or other electrochemical devices. During a drying or curing process step, the layer of coalesced sealing layer 312 is transformed into a cured sealing layer 316. Curing may be accomplished by a number of means, including heat or other radiation exposure. Curing may alternatively be accomplished by infrared radiation, heat exposure, or exposure to elevated temperature in combination with a crosslinker or crosslinking molecule in some examples. Additional layers of sealing layer composition 314, for example, to dispense a total of two or more layers, are deposited by the sealing layer composition 308 deposition head 306 in areas where an additional reinforcement 318 of a sealing layer is desired. These additional layers of sealing layer composition 308 are then cooled, dried, or cured to adhere the finished reinforcement 318 of a sealing layer to any previously deposited or cooled sealing layer 316. Building up thicker or additional reinforcement 318 layers can be advantageous for critical sealing layer areas such as the electrode tabs of a battery, where leakages often occur, for example. The layer of deposited sealing layer composition 310 may be dispensed in a pattern or deposition across the surface of the current collector 304 in a laterally non-continuous pattern. A laterally non-continuous pattern of the sealing layer refers to a pattern having features or physical contact points that do not necessarily contact one another within a lateral plane consistent with the construction of the electrochemical device. This laterally non-continuous pattern provides the possibility to isolate or direct the location of sealing layer placement and therefore activity, enabling a fabrication method providing for multiple electrochemical device structures to be manufactured continuously. Patterns may also be deposited in a variable manner from one electrochemical device to another, when the sealing layer is fabricated or deposited in such a manner as described. The movement and operation of the sealing layer composition deposition head 306 or even a platform holding the substrate layer 302 may be externally controlled by instructions received from the computer processing unit to provide a desired pattern and quantity of a deposited or dispensed of a sealing layer composition. In exemplary examples, additional heating or pressure can be applied to the sealing layer composition 312, sealing layer 316, or reinforcement layer 318 of sealing layer composition 308 either with or without additional layers of a complete electrochemical device, to provide an effective sealing layer for an electrochemical device according to the present disclosure. In certain examples, mixing of the sealing layer composition paste provides a reactive, or crosslinkable, self-hardening material. One example of a reactive self-hardening material is Loctite® SI 594 RTV sealant from Henkel. In certain examples, other materials such as additives or adhesives may be used to enhance or improve sealing performance or adhesion of the sealing layer composition 308 to other materials within an electrochemical device. In other examples, the sealing layer composition may incorporate a crosslinkable polymer, a crosslinker, a catalyst, or combinations thereof, wherein in a cured or hardened state, the sealing layer composition is a crosslinked polymer. In certain examples, the thickness of the sealing layer for electrochemical devices is from about 50 µm to about 1 mm, from about 250 µm to about 1 mm, or from about 500 µm to about 1 mm.

Electrochemical devices, 3D printed batteries, or other devices in accordance with the present disclosure provide a sealing layer composition and process to provide a sealing layer having a variable thickness to minimize moisture loss within the electrochemical device and therefore provide a more effective moisture barrier around the periphery of an electrochemical device. In certain examples, the method of producing a sealing layer, includes preparing a substrate, dispensing sealing layer composition from an extrusion dispenser onto the substrate, and drying the sealing layer composition. In certain examples, the sealing layer is dried in ambient conditions, or may alternatively be subjected to a higher temperature to dry the sealing layer composition. In some examples, two or more layers of sealing layer composition may be dispensed from an extrusion dispenser onto the substrate to provide a reinforcement to the sealing layer in specific areas.

EXAMPLES

Printing of a sealing layer composition using a biodegradable extrudable paste using 3D printing was carried out using a Hyrel Hydra 16A 3D printer that is configurable for operating a variety of print heads to dispense different types of materials, such as filament, paste, as well as other materials. For this example, a SDS-10 print head, which uses a 10 ml disposable syringe for dispensing material placed into a slot on the printers tool yoke. Other print heads or attachments may facilitate the dispensing of larger volumes, including heating elements, UV crosslinking materials, and the like are also available. As an example, Loctite SI 594 RTV sealant was loaded into the 10 ml syringe with 0.8 mm diameter Luer lock tip and the syringe loaded into the SDS-10 print head to print sealing layers using a prototypical sealing layer composition.

A test pattern of a sealing layer to be printed was constructed using OpenScad software to create the 3D object and export to an STL file format. The sealing layer object dimensions included a 50 mm outer wall, 44 mm inner wall, and 0.6 mm height. G-Code was generated with Slic3r slicing software, although other slicing software such as PrusaSlicer or Simplify3D may also be used, for the STL file with mostly default parameters. Printing speed was set to 10 mm/s, layer height to 0.5 mm and 100% infill in this example. Other 3D printers or print heads may use different print process conditions. A section of PLA sheet was taped onto a glass bed before printing started and the operating instructions for start-up, z-calibration, etc., of the printer were followed to print the object. Examples as thick as 600 μm thick have been demonstrated in printing and removal from the substrate after printing. Usable temperature ranges for such an extrusion head can range from about room temperature, or approximately 25° C. to about 250° C., or from about 80° C. to about 100° C. Heating a delivery syringe or extrusion device can provide a lower viscosity improved material flow. Alternatively, a substrate bed associated with some 3D printing apparatus can be heated from about 80° C. to about 200° C. or from about 100° C. to about 200° C. to minimize part warping during the build. In certain examples, including some paste materials, a heated bed may not be used.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or examples of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated example. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other examples of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An electrochemical device, comprising:
   a first substrate;
   a first electrode disposed upon the first substrate;
   a second substrate disposed over the first electrode; and
   an extruded sealing layer composition comprising a biodegradable polymer present in the extruded sealing layer composition in an amount of from 20% to 90% by volume of the extruded sealing layer composition; and
   wherein:
   the extruded sealing layer composition is disposed between and seals the first substrate and the second substrate.

2. The electrochemical device of claim 1, wherein the extruded sealing layer composition comprises a crosslinked polymer.

3. The electrochemical device of claim 1, wherein the extruded sealing layer composition comprises poly(ε-caprolactone) (PCL).

4. The electrochemical device of claim 1, wherein the extruded sealing layer composition comprises polylactic acid (PLA).

5. The electrochemical device of claim 1, wherein the extruded sealing layer composition comprises a biodegradable polymer, and a filler.

6. The electrochemical device of claim 5, wherein the biodegradable polymer comprises a particle having a particle size of from about 0.05 microns to about 250 microns.

7. The electrochemical device of claim 5, wherein the filler is present in the extruded sealing layer composition in an amount of from about 1.0% to about 30.0% based on a total weight of the extruded sealing layer composition.

8. The electrochemical device of claim 5, wherein the filler comprises cellulose, clay, mica, or a combination thereof.

9. The electrochemical device of claim 1, wherein the extruded sealing layer composition is disposed between the first substrate and the second substrate in a laterally non-continuous pattern.

10. The electrochemical device of claim 1, wherein the extruded sealing layer comprises a first portion and a second portion, the second portion comprising a thickness greater than that of the first portion.

11. A sealing layer composition, comprising: a biodegradable polymer comprising a biodegradable polymer present in the sealing layer composition in an amount of from 20% to 90% by volume of the sealing layer composition; and
    a filler comprising cellulose, clay, mica, or a combination thereof, wherein:
    the sealing layer composition is extruded.

12. The composition of claim 11, wherein the sealing layer composition is incorporated into an electrochemical device.

13. The composition of claim 12, wherein the electrochemical device comprises a battery.

14. The composition of claim 11, wherein the filler is present in the extruded sealing layer composition in an amount of from about 1.0% to about 30.0% based on a total weight of the extruded sealing layer composition.

15. A method of producing a sealing layer for an electrochemical device, comprising:
    preparing a substrate;
    dispensing a sealing layer composition from an extrusion dispenser onto the substrate;
    and drying the sealing layer composition;
    wherein the sealing layer forms a moisture barrier for the electrochemical device, and wherein the sealing layer composition comprises a biodegradable polymer present in the sealing layer composition in an amount of from 20% to 90% by volume of the sealing layer composition.

16. The method of producing a sealing layer of claim 15, further comprising subjecting the sealing layer to a higher temperature.

17. The method of producing a sealing layer of claim 15, further comprising dispensing two or more layers of sealing layer composition.

18. The method of producing a sealing layer of claim 15, wherein the sealing layer composition comprises a filler comprising cellulose, clay, mica, or a combination thereof.

19. The method of producing a sealing layer of claim 15, wherein the sealing layer composition has a viscosity from about 1,000 cP to about 1,000,000 cP.

* * * * *